US 11,481,212 B2

United States Patent
Dolby et al.

(10) Patent No.: US 11,481,212 B2
(45) Date of Patent: Oct. 25, 2022

(54) AUTOMATIC IDENTIFICATION OF REFERENCE DATA

(71) Applicant: International Business Machines Corporation, Armonk, NY (US)

(72) Inventors: Julian Timothy Dolby, Bronx, NY (US); Kavitha Srinivas, Port Chester, NY (US); Ibrahim Abdelaziz, Tarrytown, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/017,905

(22) Filed: Sep. 11, 2020

(65) Prior Publication Data

US 2022/0083331 A1    Mar. 17, 2022

(51) Int. Cl.
| | |
|---|---|
| *G06F 9/44* | (2018.01) |
| *G06F 8/75* | (2018.01) |
| *G06K 9/62* | (2022.01) |
| *G06F 16/901* | (2019.01) |
| *G06N 5/02* | (2006.01) |

(52) U.S. Cl.
CPC .......... *G06F 8/75* (2013.01); *G06F 16/9024* (2019.01); *G06K 9/6267* (2013.01); *G06N 5/02* (2013.01)

(58) Field of Classification Search
CPC ..... G06F 8/75; G06F 16/9024; G06K 9/6267; G06N 5/02
USPC .................................................. 717/120–123
See application file for complete search history.

(56) References Cited

U.S. PATENT DOCUMENTS

| | | | | |
|---|---|---|---|---|
| 8,095,529 | B2 * | 1/2012 | Diamond | G06F 16/955 |
| | | | | 707/708 |
| 8,176,440 | B2 * | 5/2012 | Stading | G06F 16/34 |
| | | | | 715/853 |
| 8,489,627 | B1 * | 7/2013 | Brandt | G06F 16/9038 |
| | | | | 707/765 |
| 8,572,560 | B2 | 10/2013 | Drissi | |
| 8,972,372 | B2 | 3/2015 | Elbaum | |
| 8,977,639 | B2 * | 3/2015 | Petrou | G06F 16/95 |
| | | | | 707/766 |
| 9,268,558 | B2 | 2/2016 | Elshishiny | |
| 9,665,628 | B1 * | 5/2017 | Dubey | G06N 20/00 |
| 10,042,927 | B2 * | 8/2018 | Pieper | G06F 16/951 |
| 2007/0250810 | A1 * | 10/2007 | Tittizer | G06F 8/73 |
| | | | | 717/110 |
| 2017/0004383 | A1 * | 1/2017 | Lin | G06K 9/6215 |

FOREIGN PATENT DOCUMENTS

CN            102063488 A      5/2011

OTHER PUBLICATIONS

Rahman et al., "Evaluating How Developers Use General-Purpose Web-Search for Code Retrieval", 2018, ACM, pp. 465-475. (Year: 2018).*

(Continued)

*Primary Examiner* — Ted T. Vo
(74) *Attorney, Agent, or Firm* — Jared L. Montanaro

(57) ABSTRACT

A processor may analyze one or more sections of code within a program. The processor may compute a context for each of the one or more sections of code. The processor may generate one or more search terms that are respectively associated with each of the one or more sections of code. The processor may automatically display reference data to a user.

14 Claims, 5 Drawing Sheets

(56) References Cited

OTHER PUBLICATIONS

Rahman, "Supporting Source Code Search with Context-Aware and Semantics-Driven Query Reformulation", 2019, Thesis, University of Saskatchewan, Canada, 269 pages. (Year: 2019).*
Vanderlei et al., "A Cooperative Classification Mechanism for Search and Retrieval Software Components", 2007, ACM, pp. 866-871. (Year: 2007).*
Kim et al., "FaCoY—A Code-to-Code Search Engine", 2018, ACM, pp. 946-957. (Year: 2018).*
Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

AUTOMATIC IDENTIFICATION OF REFERENCE DATA

BACKGROUND

The present disclosure relates generally to the field of software development, and more specifically to automatically identifying and displaying reference data to a user.

When faced with a programming task, programmers often rely on information from forums and repositories for ideas, and even code for a solution. Typically, any search for programs relevant to the programming task at hand rely on the programmers handcrafting a correct set of search terms to find relevant posts with the forums and repositories.

SUMMARY

Embodiments of the present disclosure include a method, computer program product, and system for automatically identifying reference data.

In some embodiments, a processor may analyze one or more sections of code within a program. The processor may compute a context for each of the one or more sections of code. The processor may generate one or more search terms that are respectively associated with each of the one or more sections of code. The processor may automatically display reference data to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
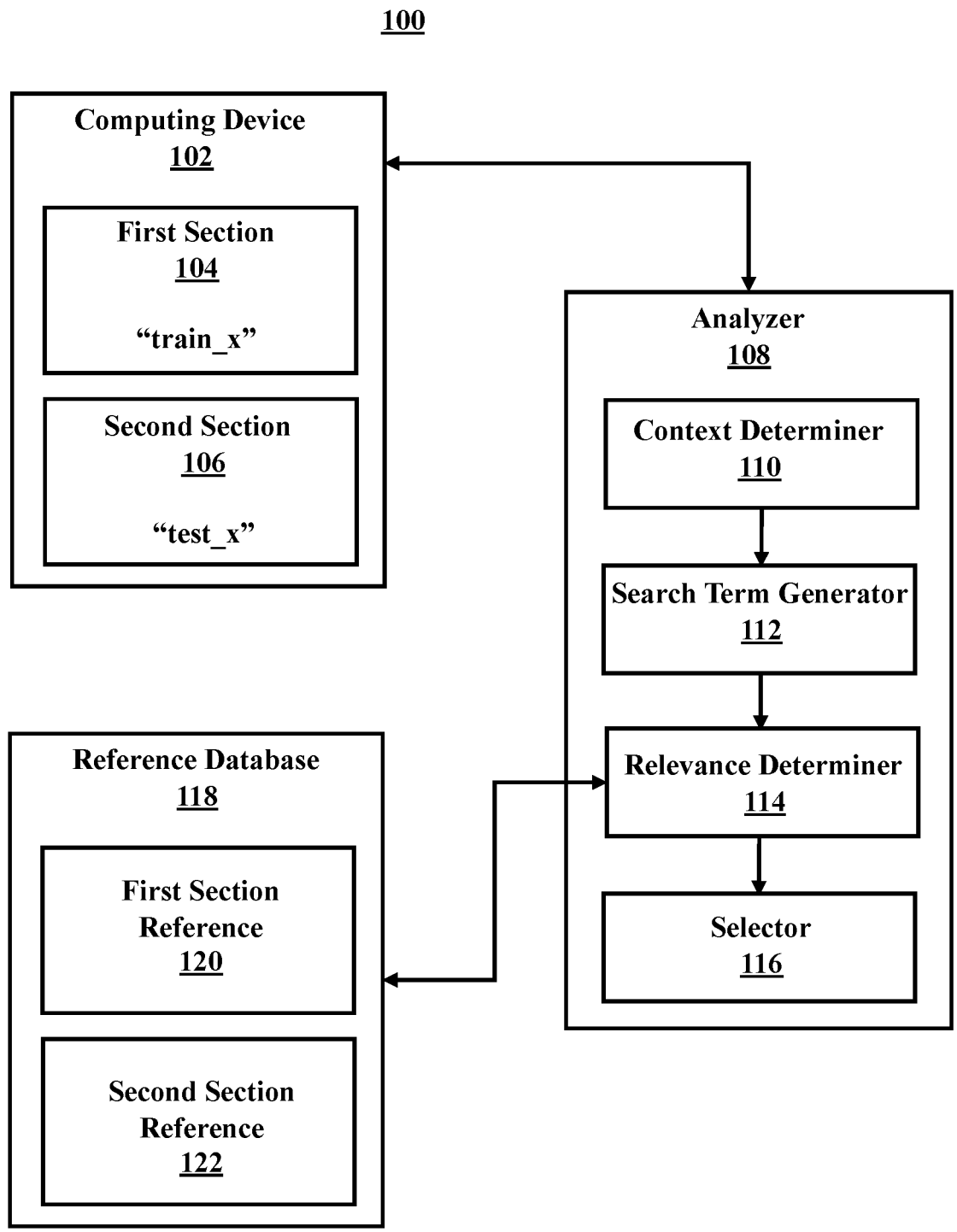
FIG. 1 is a block diagram of an example system for identifying reference data, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of software development, and more specifically to automatically identifying and displaying reference data to a user. While the present disclosure is not necessarily limited to such applications, various aspects of the disclosure may be appreciated through a discussion of various examples using this context.

When faced with a programming task, a programmer often rely on information from forums and repositories for ideas, and even code for a solution. Typically, any search for programs relevant to the programming task at hand rely on the programmer handcrafting a correct set of search terms to find relevant posts with the forums and repositories (e.g., papers/theses with code, etc.). However, the program written by the programmer for the programming task already defines a context that should be able to be leveraged to find the most relevant reference data (e.g., posts, code, articles, etc.) in forums and/or repositories. Accordingly, presented herein is a method, system, and computer program product that provide for the ability to utilize a user's (e.g., a programmer's) code to automatically identify and display (e.g., present) relevant reference data to the user to aid in their coding. Thus, the problem in the coding/software development arts of having to hand draft search terms and search forums/databases is cured. Various embodiments of such solution are provided below.

In some embodiments, a processor may analyze one or more sections of code within a program. The processor may compute a context for each of the one or more sections of code. The processor may generate one or more search terms that are respectively associated with each of the one or more sections of code. The processor may automatically display reference data to a user.

For example, a student may be developing their first application using an integrated development environment (IDE) for C++ on their computer. The IDE may be web-based and include a plugin that dynamically analyzes the student's code as they are developing the application. While analyzing the code, the plugin may identify that lines 80-83 say:

line 80: "break;
line 81: case 'x':
line 82: gameOver=true;
Line 83: break;"

The plugin may compute a context to each line (e.g., section of code) as follows: line 80: "generic," line 81: "condition," line 82: "game development," and line 83: "generic." After computing the context of each line, the plugin may then determine from the use of "gameOver" in the code that the overall context of the code is that of game development. The plugin may then generate the search terms "game, game code, game music," etc. that are associated with the context and then search multiple repositories and forums (e.g., within the IDE or over the Internet) for other code and/or articles that could be helpful to the student. The plugin may then display the found code and/or articles to the student.

It is noted that in some embodiments, the plugin may be a standalone application or be integrated directly into the IDE. In some embodiments, the plugin may be static and allow a user to select a portion of code they desire to have searched for reference data.

In some embodiments, the processor may combine each of the one or more search terms into a query. The processor may analyze a database (e.g., forums, code repositories, etc.) using the query. In some embodiments, the database may include the reference data. In some embodiments, the processor may select the reference data. For example, an IDE stand-alone application may analyze over 300 lines of code for a program in development. The application may determine that three key search terms can be computed from the context of the lines of code: "train, test, split." The application may then search a coding forum using the three key search terms looking for either exact matches to the key search terms (e.g., "split" is in an article, "train" is in a posted line of code in the forum, etc.) or adjacent matches (to be discussed more fully in regard to knowledge graphs and ancillary information). The application may then select information that most matches (e.g., meets or exceeds a threshold) the key search terms, for instance, open source code for AI model training that utilizes the "training, testing, [and] splitting" of training data.

In some embodiments, analyzing the database includes the processor computing a context of the reference data. The processor may generate a tag indicating the context of the reference data and the processor may link the tag to the reference data. For example, the first time a forum is accessed, an IDE application can determine that specific information in the forum relates to and/or answered a question presented by a user in view of search terms computed from a section of code. For instance, a specific forum correctly answered a user's inquiry into what "fetch" command is and the forum will now be linked to a tag indicating that it can be used for future queries related to "fetch" commands. The inclusion of tags will increase the efficiency of that which is presented herein and allow for subsequent users to experience a more streamlined approach to being provided reference data automatically.

In some embodiments, the processor may identify at least one other reference data. The at least one other reference data may include ancillary information that is related to at least one of the one or more search terms. The processor may link the reference data to the at least one other reference data to generate a knowledge graph. For example, a search term may be "classifier" and the processor may identify from analyzing other code and databases that "classifier" is related to "machine learning" code and multiple classifiers, such as "decisionTreeClassifiers," "KNeighborsClassifiers," which are related to "KNeighborRegressors," etc. In such a fashion, the processor can now present a user with more than one reference datum and the user can select which code/forum they review. In some embodiments, the reference data and the at least one other reference data can be presented/displayed to the user in a hierarchical fashion in which the first reference data or most relevant reference data is first displayed to the user, e.g., "KNeighborsClassifiers" is shown first because it has "classifier" and "KNeighborRegressors" is shown second.

In some embodiments, selecting the reference data may include the processor identifying a tag associated with the reference data. The tag may exceed a search term threshold. For example, over 1000 lines of code, 30 search terms can be found. The processor may access multiple databases and only present reference data from databases or the reference data itself that meets or exceeds a 70% search term threshold, e.g. 21 of the 30 search terms are match. In some embodiments, the search term threshold may be based on the reference data and the at least one other linked reference data. That is, the processor may identify that alone the reference data only has 10 of the search terms, but in conjunction with another reference data 1-degree removed from the reference data meets or exceeds the search term threshold. The processor may then present both reference data to a user. In such an embodiment, the degrees of separation or removal from a primary reference data may be capped. That is, to reach the search term threshold, only 3 reference data can be combined, etc.

In some embodiments, computing context for each of the one or more sections of code may include the processor identifying a type of expression within each of the one or more sections of code. The processor may associate a classifier indicating the type of expression, respectively, with each of the one or more sections. For example, lines 1-10 of code for a program may be identified as "boundaries" and the processor may generate and associate/link a classifier indicating the lines of code as "boundary settings." Further, lines 11-100 of code for the program may be identified as "object generation" and the processor may generate associate/link a classifier indicating the lines of code as "objects," etc.

In such an embodiment, the classifiers can be used as the search terms and allow for a more expeditious search of databases/repositories that have reference data. That is, the classifier provides a more streamlined approach for searching and allows for faster identification of reference data than traditional means of a user providing their own search terms for a given section of code.

In some embodiments, the processor may analyze, lexically, each instance of code within each of the one or more sections of code. The processor may identify, respectively, a function of each of the one or more sections of code. For example, a processor may define a section of code as any section that is between two brackets, e.g., "{ }" or any lines of code above (or in-between) an "end" statement, etc. The processor may analyze each section of code for the semantic meaning, e.g., one section of code includes the word "types," and another section of code includes the word "train," etc. The processor may then determine from the words in the sections of code that the one section is defining types of data/information/functions/etc. and the other section of code provides a means for training a model.

Referring now to FIG. 1, illustrated is a block diagram of an example system 100 for identifying reference data, in accordance with aspects of the present disclosure. As depicted, the system 100 includes a computing device 102, an analyzer 108, and a reference database 116 that are communicatively coupled, e.g., by a wireless/cloud connection, a wired connection, etc. In some embodiments, the computing device 102 includes a first section (of code) 104 and a second section (of code) 106.

In some embodiments, the analyzer 108 includes a context determiner 110, a search term generator 112, a relevance determiner 114, and a selector 116. In some embodiments, the analyzer 108 may be incorporated into a program on the computing device 102, or be a web-based application (e.g., IDE), or a plugin for a web-based application.

In some embodiments, the reference database 118 includes a first section reference 120 and a second section reference 122. In some embodiments, the reference database may be incorporated into the program on the computing device, or incorporated into the web-based application, or be any database that is accessible by web-based means.

In some embodiments, a user of the computing device 102 may be running an IDE and input the first section 104 and the second section 106. While inputting the first section 104 and the second section 106, the analyzer 108 dynamically analyzes the first section 104 and the second section 106. In some embodiments, the analyzer 108 statically analyzes the first section 104 and the second section 106 via a user selecting which section to analyzer.

In some embodiments, the analyzer 108 utilizes the context determiner 110 to determine a context of the first section 104 and the second section 106, e.g., "training" and "testing." The context determiner 110 sends the determined context to the search term generator 112 that generates a corresponding search term for each of the first section 104 and the second section 106 based on the context, e.g., "train," "test," etc. and if ancillary information is used search terms such as "model," "holdout," etc.

In some embodiments, the search term generator 112 sends the search terms to the relevance determiner 114 and to the reference database 118 as a query. In some embodiments, the sending of the search terms to the relevance determiner 114 and to the reference database 118 may be done simultaneously. In some embodiments, the relevance determine 114 analyzes the reference database 118 using the search terms as the query and determines that the first section reference 120 meets a first search term threshold for the search term associated with the first section 104 and that the second section reference 122 meets a second search term threshold for the search term associated with the second section 106. For example, the first section reference 120 includes the word, or context of the word, "train" 20 times and the second section reference 122 includes the word, or context of the word, "test" 30 times, etc.

In some embodiments, the relevance determiner 114 sends the first section reference 120 and the second reference 122 to the selector 116, which makes the final determination on which of the first section reference 120 and the second reference 122 to display to the user first on the computing device 102. For example, the second reference 122 is displayed to the user before the first section reference 120 because the second reference 122 has more matches associated with the search term(s). In some embodiments, the analyzer 108, after receiving the selections/order of selections from the selector 116, sends the first section reference 120 and/or the second reference 122 to the computing device 102 to be displayed to a user.

It is noted that the steps presented herein provide for the automation of identifying and presenting reference data/information to a user, which can be used to help the user identify malfunctions or bugs in their code, or to help streamline the user's coding efforts (e.g., suggesting the user copy a portion of opensource code that will function the same as the code they are trying to create), or to help the user find available forums that may help the user in understanding the function of a section/line of code, etc.

Figure 2:
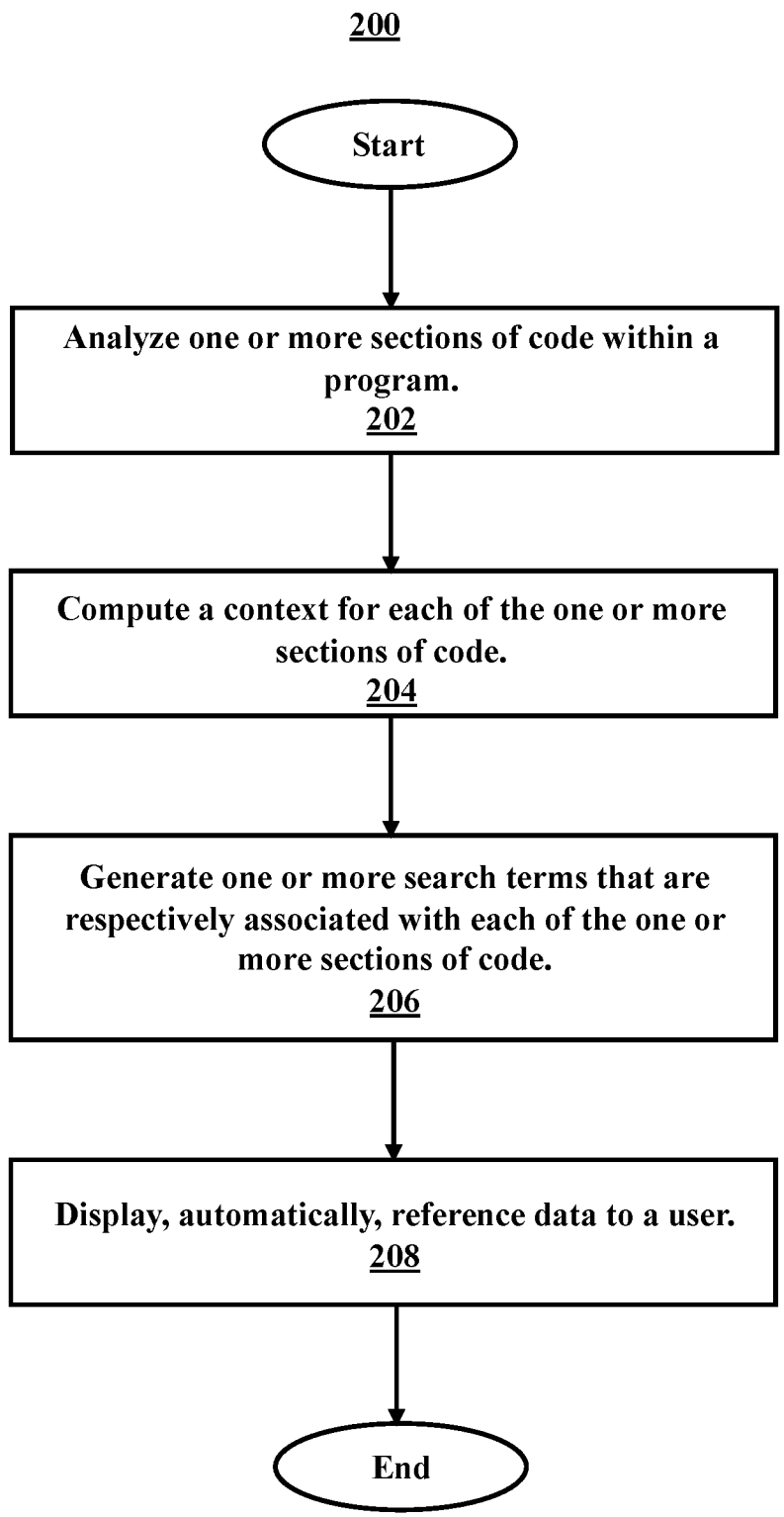
FIG. 2 is a flowchart of an example method for displaying reference data to a user, in accordance with aspects of the present disclosure.

Referring now to FIG. 2, illustrated is a flowchart of an example method 200 for displaying reference data to a user, in accordance with aspects of the present disclosure. In some embodiments, the method 200 may be performed by a processor and/or a processor in a system, such as the system 100 of FIG. 1.

In some embodiments, the method 200 begins at operation 202, where the processor analyzes one or more sections of code within a program. In some embodiments, the code may be analyzed using various natural language processing techniques that can identify common words, such as "command," "execute," etc. and/or coding language syntax, such as "DDL," "arg," etc.

In some embodiments, the method 200 proceeds to operation 204, where the processor computes a context for each of the one or more sections of code. For example, the context of "argc" is computed to be a parameter in the C++ computing language. In some embodiments, the method 200 proceeds to operation 206. In some embodiments, the processor may run the sections of the code in a sandbox environment to identify how the code performs/functions and then derive a context for the section of code. For example, the processor may execute the section of code and identify that it retrieves images from an outside database. The processor may compute the context of the section of code to be that of "pulling images" and/or "database connections."

At operation 206, the processor generates one or more search terms that are respectively associated with each of the one or more sections of code. For example, a first section (e.g., line) of code may include "argc" and a second section may include "argv." The processor may compute that the context as "C++ arguments" and generate search terms (that can be determined from ancillary information) as "C++ basics," "C++," "arguments," etc.

In some embodiments, the method 200 proceeds to operation 208, where the processor automatically displays reference data to a user. Following the example above, the processor may use the search terms to search multiple reference data bases for information associated with the search terms and display the reference data to the user. In some embodiments, the method 200 may end after operation 208.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
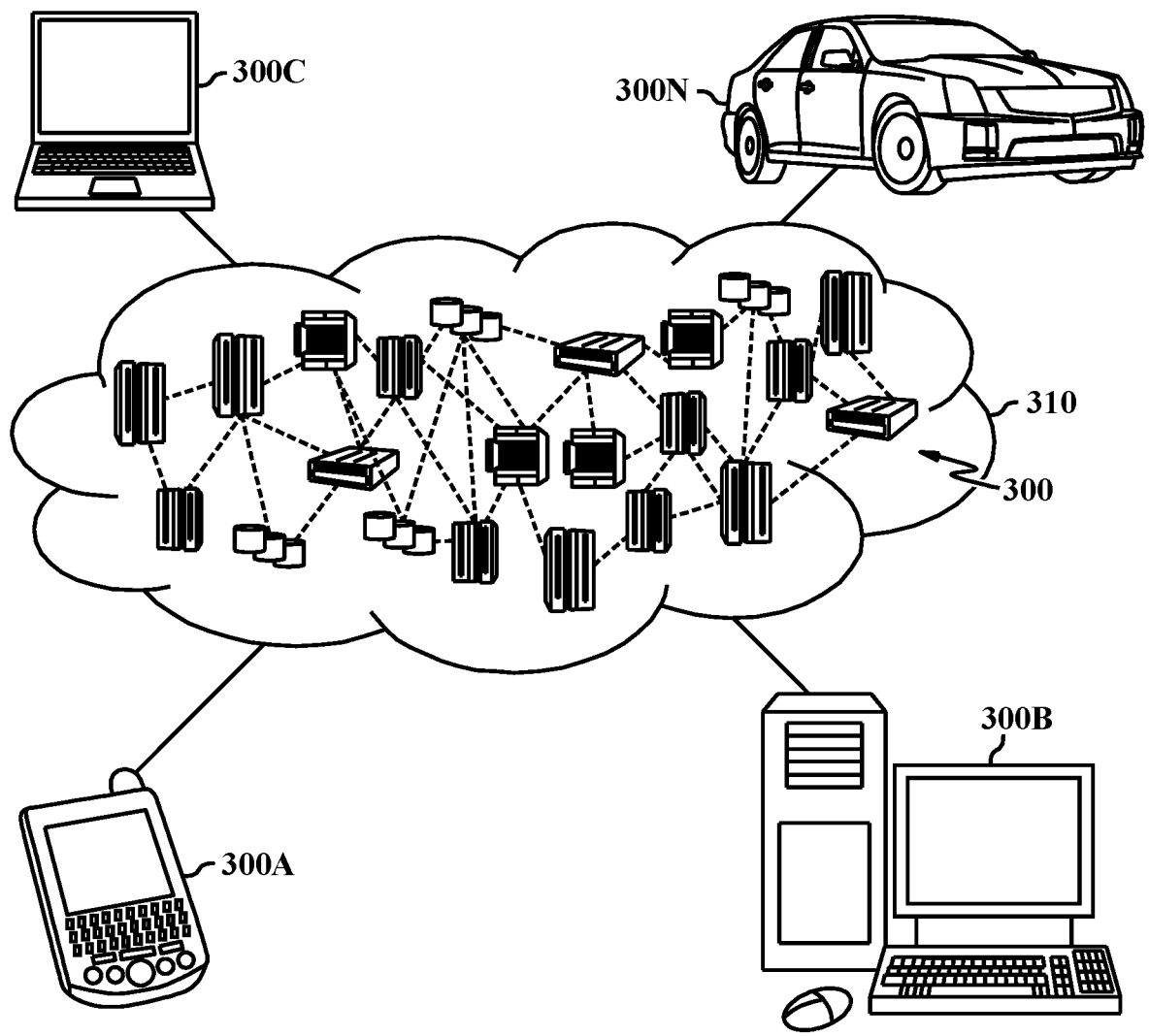
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
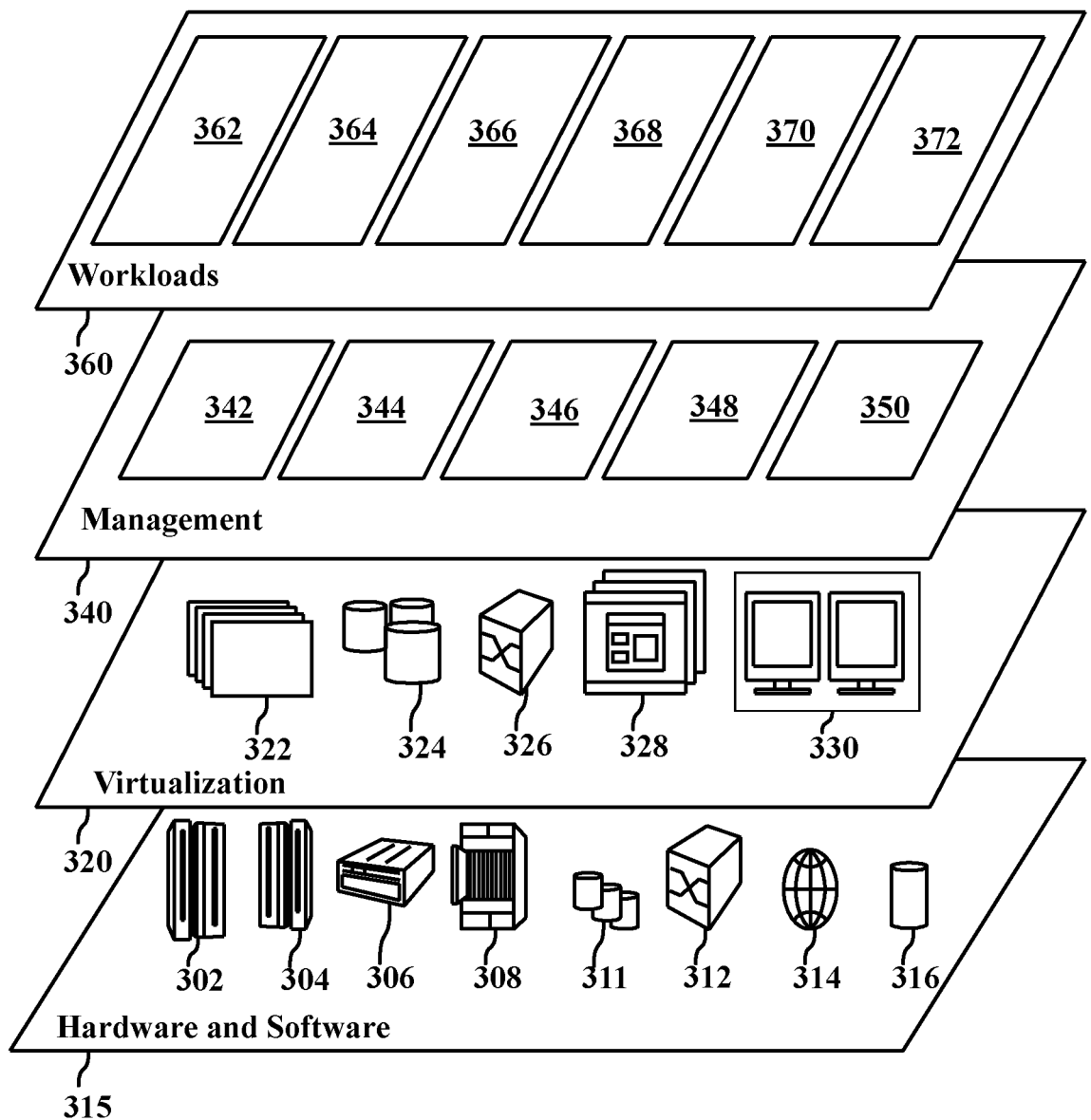
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and automatically identifying and displaying reference data 372.

Figure 4:
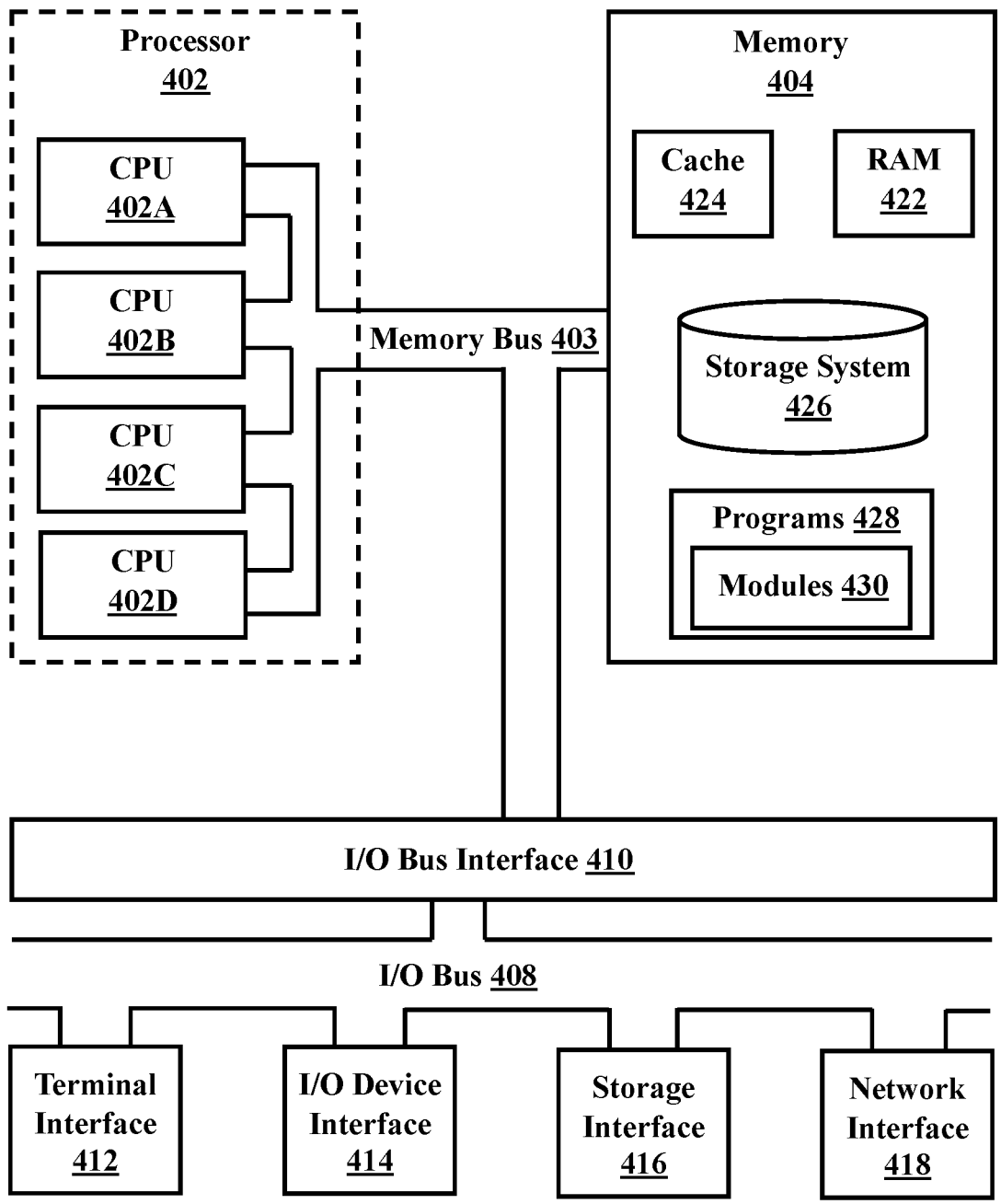
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for automatically identifying reference data, the method comprising:
   analyzing, by a processor, one or more sections of code within a program;
   computing a context for each of the one or more sections of code;
   generating one or more search terms that are respectively associated with each of the one or more sections of code;
   combining each of the one or more search terms into a query;
   analyzing a database using the query, wherein the database includes the reference data, and wherein analyzing the database includes:
      computing a context of the reference data,
      generating a tag indicating the context of the reference data, and
      linking the tag to the reference data;
   selecting the reference data; and
   displaying, automatically, reference data to a user.

2. The method of claim 1, further comprising:
   identifying at least one other reference data, wherein the at least one other reference data includes ancillary information that is related to at least one of the one or more search terms; and
   linking the reference data to the at least on other reference data to generate a knowledge graph.

3. The method of claim 1, wherein selecting the reference data includes:
   identifying a tag associated with the reference data, wherein the tag exceeds a search term threshold.

4. The method of claim 1, wherein computing the context for each of the one or more sections of code includes:
- identifying a type of expression within each of the one or more sections of code; and
- associating a classifier indicating the type of expression, respectively, with each of the one or more sections.

5. The method of claim 4, further comprising:
- analyzing, lexically, each instance of code within each of the one or more sections of code; and
- identifying, respectively, a function of each of the one or more sections of code.

6. A system comprising:
- a memory; and
- a processor in communication with the memory, the processor being configured to perform operations comprising:
- analyzing, by a processor, one or more sections of code within a program;
- computing a context for each of the one or more sections of code;
- generating one or more search terms that are respectively associated with each of the one or more sections of code;
- combining each of the one or more search terms into a query;
- analyzing a database using the query, wherein the database includes the reference data, and wherein analyzing the database includes:
  - computing a context of the reference data,
  - generating a tag indicating the context of the reference data, and
  - linking the tag to the reference data;
- selecting the reference data; and
- displaying, automatically, reference data to a user.

7. The system of claim 6, wherein the processor is further configured to perform operations comprising:
- identifying at least one other reference data, wherein the at least one other reference data includes ancillary information that is related to at least one of the one or more search terms; and
- linking the reference data to the at least on other reference data to generate a knowledge graph.

8. The system of claim 6, wherein selecting the reference data includes:
- identifying a tag associated with the reference data, wherein the tag exceeds a search term threshold.

9. The system of claim 6, wherein computing the context for each of the one or more sections of code includes:
- identifying a type of expression within each of the one or more sections of code; and
- associating a classifier indicating the type of expression, respectively, with each of the one or more sections.

10. The system of claim 9, wherein the processor is further configured to perform operations comprising:
- analyzing, lexically, each instance of code within each of the one or more sections of code; and
- identifying, respectively, a function of each of the one or more sections of code.

11. A computer program product comprising a computer readable storage medium having program instructions embodied therewith, the program instructions executable by a processor to cause the processor to perform operations, the operations comprising:
- analyzing, by a processor, one or more sections of code within a program;
- computing a context for each of the one or more sections of code;
- generating one or more search terms that are respectively associated with each of the one or more sections of code;
- combining each of the one or more search terms into a query;
- analyzing a database using the query, wherein the database includes the reference data, and wherein analyzing the database includes:
  - computing a context of the reference data,
  - generating a tag indicating the context of the reference data, and
  - linking the tag to the reference data;
- selecting the reference data; and
- displaying, automatically, reference data to a user.

12. The computer program product of claim 11, wherein the processor is further configured to perform operations comprising:
- identifying at least one other reference data, wherein the at least one other reference data includes ancillary information that is related to at least one of the one or more search terms; and
- linking the reference data to the at least on other reference data to generate a knowledge graph.

13. The computer program product of claim 11, wherein selecting the reference data includes:
- identifying a tag associated with the reference data, wherein the tag exceeds a search term threshold.

14. The computer program product of claim 11, wherein computing the context for each of the one or more sections of code includes:
- identifying a type of expression within each of the one or more sections of code; and
- associating a classifier indicating the type of expression, respectively, with each of the one or more sections.

* * * * *